(12) United States Patent
Men

(10) Patent No.: US 9,377,058 B2
(45) Date of Patent: Jun. 28, 2016

(54) FLEXIBLE COUPLING

(71) Applicant: KLA-Tencor Corporation, Milpitas, CA (US)

(72) Inventor: Daniel Men, Haifa (IL)

(73) Assignee: KLA-Tencor Corporation, Milpitas, CA (US)

( * ) Notice: Subject to any disclaimer, the term of this patent is extended or adjusted under 35 U.S.C. 154(b) by 17 days.

(21) Appl. No.: 14/583,461

(22) Filed: Dec. 26, 2014

(65) Prior Publication Data

US 2015/0111651 A1    Apr. 23, 2015

Related U.S. Application Data

(63) Continuation of application No. PCT/US2013/047919, filed on Jun. 26, 2013.

(60) Provisional application No. 61/665,032, filed on Jun. 27, 2012.

(51) Int. Cl.
  *F16D 3/50* (2006.01)
  *F16D 3/00* (2006.01)

(52) U.S. Cl.
  CPC . *F16D 3/005* (2013.01); *F16D 3/50* (2013.01)

(58) Field of Classification Search
  CPC .................................. F16D 3/005; F16D 3/50
  USPC .......................... 464/81, 84, 86, 99, 101, 126
  See application file for complete search history.

(56) References Cited

U.S. PATENT DOCUMENTS

| 1,633,243 | A | * | 6/1927 | Eckart | F16D 3/10 |
| | | | | | 464/86 X |
| 2,475,010 | A | * | 7/1949 | Chilton | F16D 3/72 |
| | | | | | 464/84 X |
| 2,627,733 | A | * | 2/1953 | Amberg | F16D 3/56 |
| | | | | | 464/84 |
| 2,860,495 | A | * | 11/1958 | Stark | F16C 11/12 |
| 3,336,764 | A | * | 8/1967 | Chambers | F16D 3/50 |
| | | | | | 464/99 X |
| 3,934,487 | A | * | 1/1976 | Becker | F16D 3/005 |
| | | | | | 464/84 |
| 4,033,144 | A | | 7/1977 | Allen | |
| 4,207,758 | A | | 6/1980 | Stone | |
| 4,516,958 | A | * | 5/1985 | Phillips | F16D 3/005 |
| 4,741,722 | A | | 5/1988 | Federn | |
| 4,850,933 | A | | 7/1989 | Osborn | |
| 5,951,400 | A | | 9/1999 | Giere | |
| 6,077,165 | A | | 6/2000 | Jewell | |

FOREIGN PATENT DOCUMENTS

| EP | 0041708 A2 | 12/1981 |
| EP | 0918950 B1 | 6/1999 |
| WO | 9807999 | 2/1998 |

* cited by examiner

*Primary Examiner* — Gregory Binda
(74) *Attorney, Agent, or Firm* — Simpson & Simpson, PLLC

(57) ABSTRACT

A flexible coupling including two body members each having an internal flexible member to cooperate with a rotational shaft and an external connecting member interconnecting two body members with each other. In order to minimize the axial length of the coupling maintaining its high torsional rigidity but enabling for compensation of substantial shafts misalignments such as parallel, angular or skewed axial misalignment, the internal flexible member passes over the coupling axis forming cavities between the flexible member and internal walls of the external connecting member in a plane perpendicular to the coupling axis and is provided with at least one flexible section between the connecting member and the coupling axis, the flexible section being substantially parallel to the coupling axis.

12 Claims, 4 Drawing Sheets

FLEXIBLE COUPLING

CROSS-REFERENCE TO RELATED APPLICATIONS

This application is a Continuation of International Patent Application Serial No. PCT/US2013/047919, filed on Jun. 26, 2013, which application claims priority of U.S. Provisional Patent Application No. 61/665,032, filed on Jun. 27, 2012, which applications are incorporated herein by reference in their entireties.

FIELD OF THE INVENTION

The invention relates to a flexible coupling comprising two body members, each having an internal flexible member to cooperate with a rotational shaft and an external connecting member interconnecting two body members with each other. Couplings of this kind are used to transmit torque from one shaft to another accommodating possible parallel and/or angular misalignment of the shafts. They can also be used for vibration damping and/or noise reduction.

BACKGROUND OF THE INVENTION

Various types of flexible couplings are described in European patent specification EP 0 041 708 A2 (Seppala), U.S. Pat. No. 4,207,758 (Stone), and U.S. Pat. No. 4,741,722 (Federn).

International patent application publication no. WO 98/07999 (Jewell) describes a flexible coupling for shafts that are nominally collinear and are to be coupled to rotate together while being subject to misalignments of different kinds. It includes at least one curved re-entrant column circumferentially spaced about the axis of rotation and individually deformable by bending or twisting or both, and therefore responsive to deformations introduced by parallel and axial shaft alignment. The composite result is that torque of a given loading is transferred uniformly from the driving to the driven member regardless of the misalignment effects since different deformations are introduced and compensated in the column or columns dependent on their instantaneous positions in the cycle of rotation. The arrangement enables meeting different load and misalignment requirements by varying the parameters of the columns, the manner in which they are coupled to the shafts, and the characteristics of the columns along their lengths. In an embodiment of this coupling comprising two curved re-entrant columns, each column contributes approximately half of the needed compensation, so that the coupling can be used where shafts misalignments are substantial. Nonetheless, the length of such a coupling is the sum of the lengths of the curved re-entrant columns and the width of the gap necessary to be formed in-between them. Furthermore, an additional element such as a sleeve is required for connecting the columns with each other.

Concerning continually increasing requirements for compactness of such flexible couplings, especially to be used in direct (in-line) design of drive systems, there is still a need for providing a flexible coupling featuring reduced axial length, which would be easy to manufacture and to assemble.

BRIEF SUMMARY OF THE INVENTION

According to aspects illustrated herein, there is provided a flexible coupling including two body members each having an internal flexible member to cooperate with a rotational shaft and an external connecting member interconnecting two body members with each other. In order to minimize the axial length of the coupling maintaining its high torsional rigidity but enabling for compensation of substantial shafts misalignments such as parallel, angular or skewed axial misalignment, the internal flexible member passes over the coupling axis forming cavities between the flexible member and internal walls of the external connecting member in a plane perpendicular to the coupling axis and is provided with at least one flexible section between the connecting member and the coupling axis, the flexible section being substantially parallel to the coupling axis. The flexible members of the adjoining body members of the coupling are rotated with respect to each other so that the flexible sections of each flexible member are located inside the cavities of the adjoining flexible member.

According to aspects illustrated herein, there is provided a flexible coupling including a coupling axis, a first body member and a second body member operatively arranged about the coupling axis, each of the first and second body members having a rotational shaft, an external connecting member operatively arranged to connect the first and second body members with each other, the external connecting member having internal walls, and an internal flexible member arranged to cooperate with the rotational shaft, the internal flexible member operatively arranged to form at least one cavity between the internal flexible member and the internal walls of the external connecting member in a plane perpendicular to the coupling axis, and at least one flexible section arranged within the internal flexible member of the first and second body members between the external connecting member and the coupling axis, the at least one flexible section arranged substantially parallel to the coupling axis. The internal flexible members of the first and second body members are rotatable with respect to each other so that the at least one flexible section of the internal flexible member of the first body member is locatable inside the at least one cavity of the second body member.

It is therefore a primary object of the invention to provide a minimized axial length of the coupling.

Another object of the present invention is to minimize a number of distinct constructional elements of the coupling; elements that might be easily manufactured using conventional and cost efficient machining production technologies and easily assembled to form a coupling.

Yet another object of the present invention is to provide a coupling featuring high torsional rigidity but enabling for compensation of substantial shafts misalignments such as parallel, angular or skewed axial misalignment.

In order to accomplish the aforementioned and other objects, in a flexible coupling of the kind mentioned in the outset, according to the present invention, the internal flexible member passes over the coupling axis forming cavities between the flexible member and internal walls of the external connecting member in a plane perpendicular to the coupling axis and is provided with at least one flexible section between the connecting member and the coupling axis, said flexible section being substantially parallel to the coupling axis, wherein flexible members of the adjoining body members of the coupling are rotated with respect to each other so that the flexible sections of each flexible member are located inside the cavities of the adjoining flexible member.

Such a construction enables for minimizing the axial length of the coupling.

Preferably, flexible members of the adjoining body members are substantially perpendicular to each other.

Preferably, both body members of the coupling have the same construction and are made of the same material. This simplifies the manufacturing process and makes it more cost efficient.

Preferably, the at least one flexible section of the flexible member is U-shaped. Such a shape enables for easy compensation of shafts displacement and inclination.

Preferably, the flexible member is provided with a fixing member for the rotational shaft, preferably, in a form of a clamp or a sleeve and at least one fixing or radial screw tightens the fixing member to the shaft.

Alternatively, a body member may be made as a single element with the shaft.

Preferably, the connecting members are provided with guiding means, preferably, in a form of pairwise matching projections and grooves providing a simple mechanism for a concentric and fool-proof assembly of the coupling.

Preferably, the body members are made of a metal, preferably an aluminium alloy using conventional machining production technologies such as stamping or dying.

The coupling of the present invention features high torsional rigidity, enabling to achieve excellent motion control and accuracy of a drive system, in combination with a relatively small axial length. It is particularly suitable for interconnecting an encoder shaft with a ball screw shaft. In such a configuration, the coupling according to the present invention provides high repeatability and prevents axial ball screw motion.

These and other objects, advantages and features of the present invention will be better appreciated by those having ordinary skill in the art in view of the following detailed description of the invention in view of the drawings.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
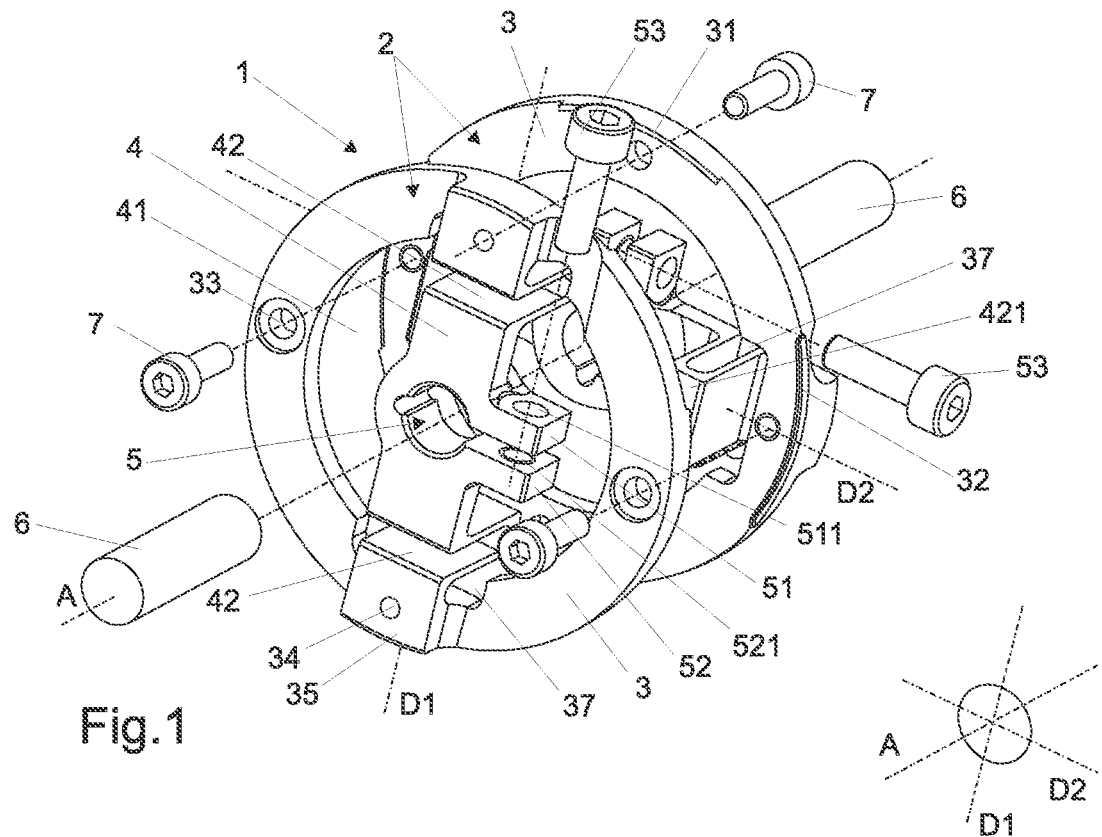
FIG. 1 illustrates an exploded perspective view of an embodiment of the coupling of the invention.
Figure 2:
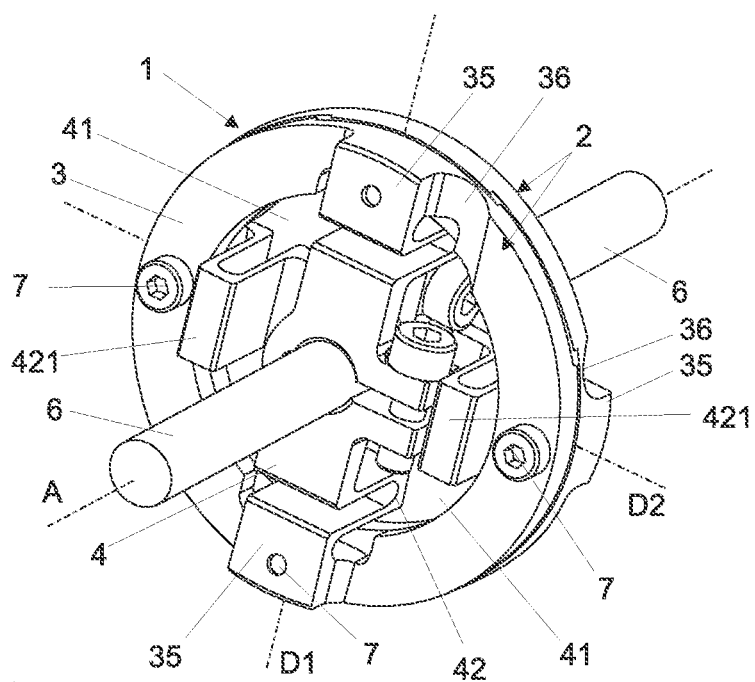
FIG. 2 illustrates an assembled perspective view of the embodiment of the coupling shown in FIG. 1.

Coupling 1 shown in FIGS. 1 and 2 comprises two body members 2, each having external connecting member 3 and internal flexible member 4 provided with fixing member 5 for rotational shaft 6. The coupling axis is indicated by line A.

In this embodiment, body members 2 are uniform bodies of the same construction and are made of sandblasted aluminium alloy AL-7075-T6. External connecting member 3 has a form of a ring, though other shapes are obviously also possible.

Each flexible member 4 of coupling body member 2 extends between axial projections 35 of external connecting ring 3 and along the diameter of connecting ring 3 (indicated by the lines D1 and D2), so that hollow spaces or cavities 41 are formed between flexible member 4 and internal walls of connecting ring 3 in a plane perpendicular to coupling axis A. Furthermore, each flexible member 4 is provided with two flexible U-shaped sections 42 parallel to coupling axis A.

During assembly of coupling 1 (cf. FIG. 4), body members 2 are positioned in such a way that axially remote bridges 421 of U-shaped sections 42 of flexible members 4 face each other while flexible members 4 are substantially perpendicular to each other. In this position, it is possible to insert U-shaped sections 42 of first and the second body member 2, respectively, into cavities 41 of second and first body member 2.

In this embodiment, connecting members 3 of body members 2 are fixed with each other, as shown in FIG. 2, by means of four screws 7 passing through openings 33 and screwed in internally threaded openings 34. It should be appreciated that other fixing means, such as, for example, nuts and bolts or rivets, are equally possible.

In this embodiment, shaft fixing member 5 has a form of a clamp provided with two projections 51 and 52 with coaxial throughout openings 511, 521. Screw 53 passing through opening 511 may be screwed in internal thread of opening 521 thus, tightening shaft 6 to fixing member 5. In order to facilitate guidance of screw 53, connecting member 3 is provided with recess 36 located along the axis of screw 53 and openings 511, 521 in projections 51 and 52.

Taking into account single body member 2, shaft 6 connected to this body member 2 has substantially two degrees of freedom: to some extent it may displace along diameter D1 (or D2) of flexible member 4 and to some extent it may tilt in a plane defined by diameter D1 (or D2) and axis A of the coupling. It should be appreciated that after the coupling is assembled, shaft 6 will have substantially four degrees of freedom with respect to other shaft 6 enabling for compensation of shafts parallel misalignment in plane D1-D2 as well as shafts angular misalignment with respect to axis A of coupling 1.

Figure 3:
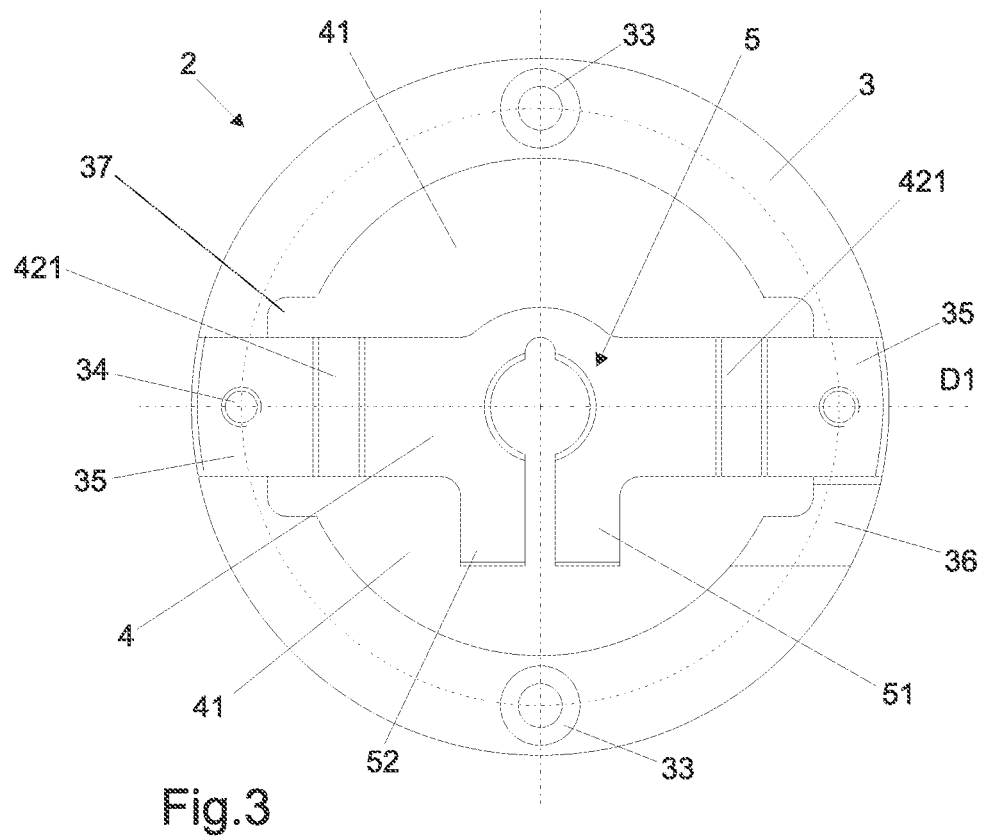
FIG. 3 is a top view of a body member of the embodiment of the coupling shown in FIG. 1.

As shown in FIG. 3, connecting member 3 is provided with two internal cutouts 37 in the area of axial projections 35 to increase range of deformations of U-shaped sections 42.

Figure 4:
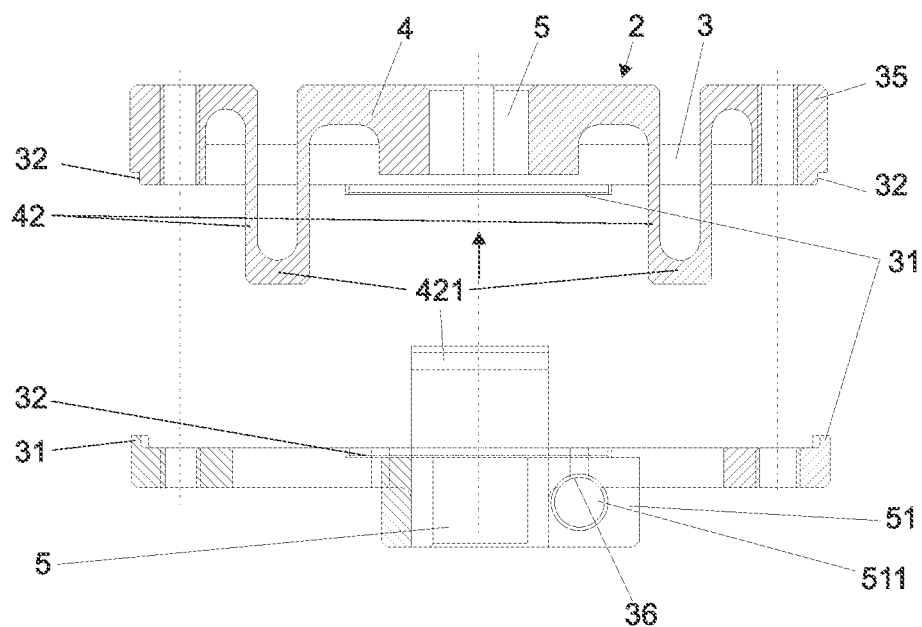
FIG. 4 is a schematic cross-sectional view of the body members of the embodiment of the coupling shown in FIG. 1 prior assembly in a plane defined by the coupling axis A and diameter of one of the flexible members.

As shown in FIG. 4, pairwise matching circumferential projections 31 and grooves 32 of connecting rings 3 facilitate a fool-proof positioning of body members 2 during assembling of coupling 1.

Other exemplary embodiments of the coupling of the present invention are presented with reference to FIGS. 5 to 10, wherein reference numerals corresponding to the same functional elements remain the same as in FIGS. 1 to 4, where appropriate appended with suffixes "a" to "e".

Figure 5:
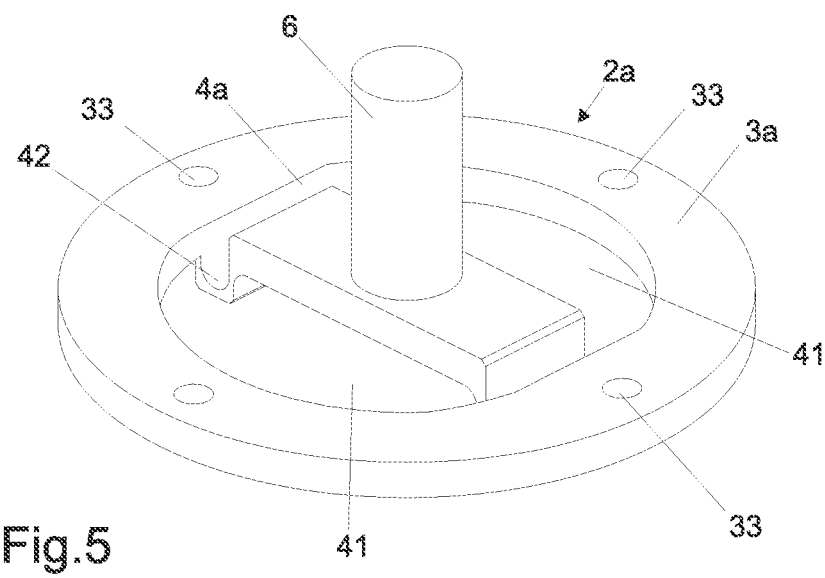
FIG. 5 shows a perspective view of another embodiment of a body member of a coupling according to the present invention.
Figure 6:
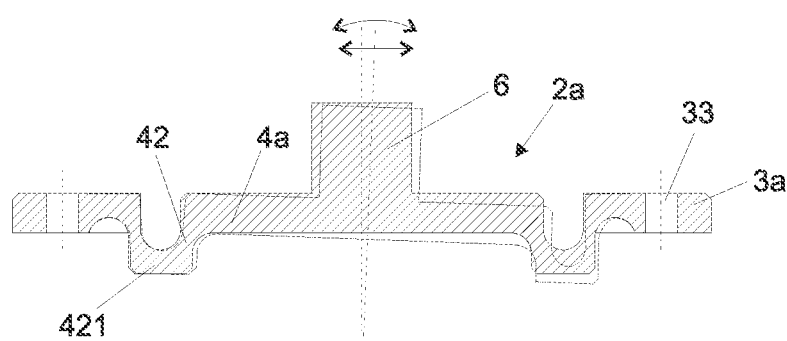
FIG. 6 shows a cross-sectional view of the embodiment of the body member of the coupling shown in FIG. 5.

FIGS. 5 and 6 show a relatively simple embodiment of body member 2a made as a single uniform element with shaft 6. Flexible member 4a extends directly from connecting ring 3a and the height of flexible U-shaped section 42 corresponds to the height of connecting ring 3a. Openings 33 enable for connecting rings 3a using rivets (not shown). An exemplary deformed state of flexible member 4a is depicted by the dashed lines in FIG. 6.

Figure 7:
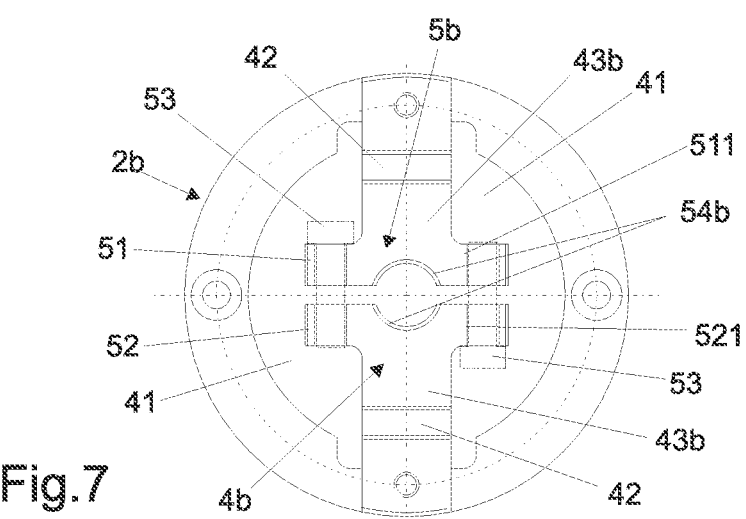
FIG. 7 shows a top view of an example embodiment of a body member of a coupling according to the present invention.

Yet another exemplary embodiment of body member 2b presented in FIG. 7 is provided with internal flexible member 4b comprising two separate parts 43b. Fixing member 5b has a form of a clamp formed by two opened recesses 54b of parts 43b having surfaces facing each other. Each recess 54b is surrounded by two projections 51 and 52 in which throughout openings 511 or 521 are formed. Openings 511, 521 are arranged coaxially pair-wise forming channels for fixing screws 53 to constrict clamp 5b.

Figure 8:
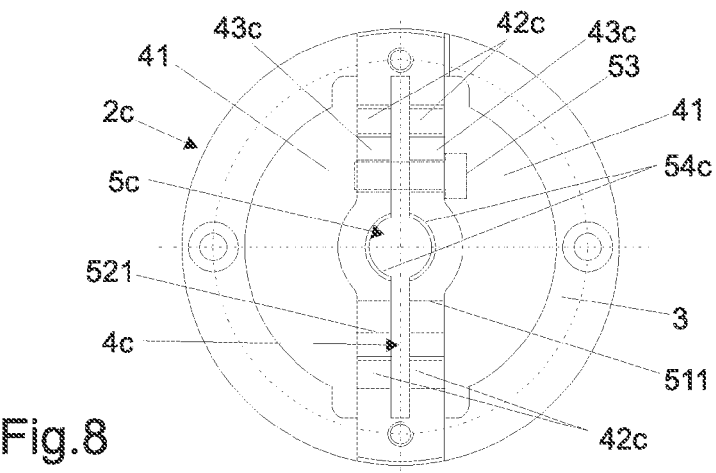
FIG. 8 shows a top view of an example embodiment of a body member of a coupling according to the present invention.

Further exemplary embodiment of body member 2c presented in FIG. 8 is provided with internal flexible member 4c comprised of two separate diametrical half-elements 43c arranged in parallel to each other. Each diametrical half-element 43c comprises two symmetrically distributed U-shaped sections 42c. Here, fixing member 5c has a form of a clamp formed by two opened recesses 54c formed on internal surfaces of diametrical half-elements 43c and facing each other. Each recess 54c is surrounded at both sides by two throughout openings 511 or 521. Openings 511, 521 are arranged coaxially pair-wise forming channels for fixing screws 53 constricting clamp 5c.

Figure 9:
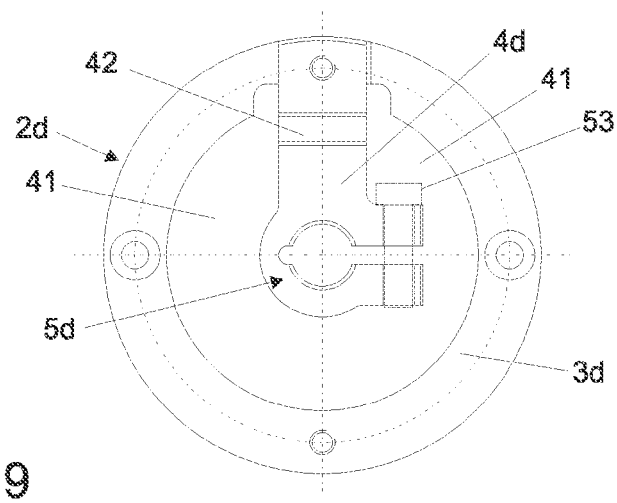
FIG. 9 shows a top view of an example embodiment of a body member of a coupling according to the present invention; and, FIG. 10 shows a top view of an example embodiment of a body member of a coupling according to the present invention.

FIG. 9 shows an embodiment of body member 2d provided with internal flexible member 4d connected only from one end to connecting member 3d. Flexible member 4d is provided with only one U-shaped section 42 and centrally located clamp 5d. It should be appreciated that such a design substantially increases the wind-up of the coupling so that its use would be limited to applications where high torsional rigidity is not a prerequisite.

Figure 10:
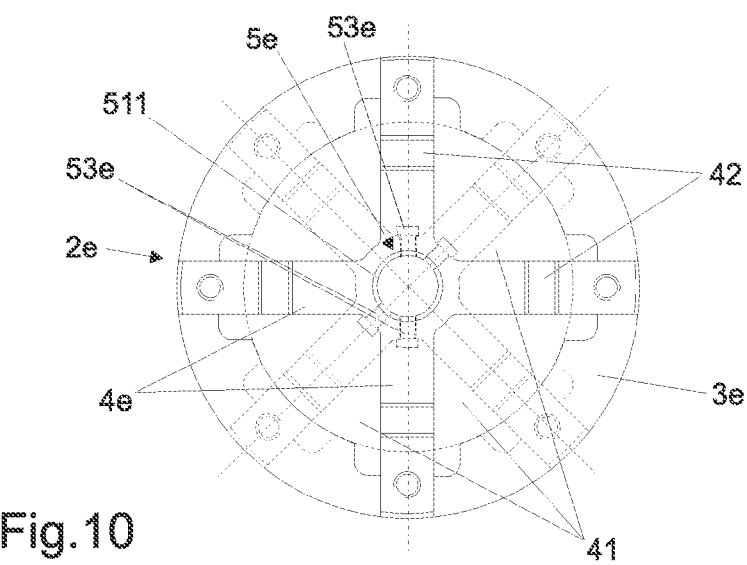

An embodiment of body member 2e shown in FIG. 10 is provided with internal flexible member 4e in a form of a four-armed cross to increase torsional rigidity of the coupling, wherein each arm of flexible member 4e is provided with U-shaped section 42. Shaft fixing member 5e has a form of a centrally located sleeve with radial throughout opening 511 into which two radial screws 53 may be screwed to fix the shaft to be mounted to the sleeve. In this embodiment, adjoining body members 2e of coupling are rotated by 45° with respect to each other so that flexible sections 42 of each flexible member 4e are located inside cavities 41 of adjoining flexible member 4e.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE NUMBERS

1 Coupling
2 Body member
3 Connecting member (ring)
4 Internal flexible member
5 Shaft fixing member
6 Rotational shaft
7 Screws
31 Projections
32 Grooves
33 Openings
34 Internally threaded openings
35 Projections
36 Recess
37 Cutouts
41 Hollow spaces or cavities
42 Flexible (U-shaped) sections
43b Parts
51 Projection
52 Projection
53 (Clamp) screw
53e Radial screw
54b Recess
421 Axially remote bridges (of the U-shaped sections 42)
511 Coaxial throughout opening
521 Coaxial throughout opening

What is claimed is:
1. A flexible coupling, comprising:
a coupling axis;
a first body member and a second body member operatively arranged about said coupling axis, each of said first and second body members comprising:
   a rotational shaft;
   an external connecting member operatively arranged to connect said first and second body members with each other, said external connecting member having internal walls; and,
   an internal flexible member arranged to cooperate with said rotational shaft, said internal flexible member operatively arranged to form at least one cavity between said internal flexible member and said internal walls of said external connecting member in a plane perpendicular to said coupling axis; and,
at least one flexible section arranged within said internal flexible member of said first and second body members between said external connecting member and said coupling axis, said at least one flexible section arranged substantially parallel to said coupling axis;

wherein said internal flexible members of said first and second body members are rotatable with respect to each other so that said at least one flexible section of said internal flexible member of said first body member is locatable inside said at least one cavity of said second body member.

2. The flexible coupling recited in claim 1, wherein said internal flexible members of said first and second body members are arranged substantially perpendicular to each other.

3. The flexible coupling recited in claim 1, wherein said first and second body members have the same construction and/or are made of the same material.

4. The flexible coupling recited in claim 1, wherein said at least one flexible section is U-shaped.

5. The flexible coupling recited in claim 1, wherein said internal flexible member is provided with a fixing member for said rotational shaft.

6. The flexible coupling recited in claim 5, wherein said fixing member has a form of a clamp and at least one fixing screw tightens said fixing member to said shaft.

7. The flexible coupling recited in claim 5, wherein said fixing member has a form of a sleeve and at least one radial screw tightens said fixing member to said shaft.

8. The flexible coupling recited in claim 1, wherein said first body member is made as a single element with said shaft.

9. The flexible coupling recited in claim 1, wherein said connecting members are provided with guiding means.

10. The flexible coupling recited in claim 9, wherein said guiding means have a form of pairwise matching projections and grooves.

11. The flexible coupling recited in claim 1, wherein said first and second body members are made of a metal.

12. The flexible coupling recited in claim 1, wherein said first and second body members are made of an aluminium alloy.

* * * * *